US012603106B2

(12) United States Patent
Uehara

(10) Patent No.: US 12,603,106 B2
(45) Date of Patent: \*Apr. 14, 2026

(54) DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Manabu Uehara, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/981,954

(22) Filed: Dec. 16, 2024

(65) Prior Publication Data

US 2025/0118331 A1 Apr. 10, 2025

Related U.S. Application Data

(63) Continuation of application No. 18/492,712, filed on Oct. 23, 2023, now Pat. No. 12,205,621, which is a (Continued)

(30) Foreign Application Priority Data

Feb. 7, 2019 (JP) ................................. 2019-020632

(51) Int. Cl.
*G11B 5/48* (2006.01)
*G11B 25/04* (2006.01)

(52) U.S. Cl.
CPC .......... *G11B 5/4833* (2013.01); *G11B 5/4826* (2013.01); *G11B 5/4873* (2013.01); *G11B 25/043* (2013.01); *G11B 2220/2508* (2013.01)

(58) Field of Classification Search
None
See application file for complete search history.

(56) References Cited

U.S. PATENT DOCUMENTS 4,851,942 A * 7/1989 Kumasaka ........... G11B 5/6005
5,345,352 A * 9/1994 Nakano ................ G11B 25/043
360/99.19

(Continued)

FOREIGN PATENT DOCUMENTS

CN 1153373 A 7/1997
CN 211150102 U 7/2020
(Continued)

*Primary Examiner* — Peter Vincent Agustin
(74) *Attorney, Agent, or Firm* — Maier & Maier, PLLC

(57) ABSTRACT

According to one embodiment, a disk device includes two magnetic disks opposing each other at intervals of 1.2 to 1.5 mm, and at least two suspension assemblies movable respectively between the two magnetic disks. Each of the suspension assemblies includes a base plate, a load beam extending from the base plate, a tab extending from a distal end of the load beam, a wiring member on the load beam and the base plate, including a gimbal portion, and a magnetic head on the gimbal portion, abutting on a dimple of the load beam via the gimbal portion. The ratio of a distance from a bendable location of the load beam to a center of the dimple with respect to a distance from the center of the dimple to a tip of the tab is 2.8 to 3.8.

7 Claims, 9 Drawing Sheets

Related U.S. Application Data continuation of application No. 17/837,667, filed on Jun. 10, 2022, now Pat. No. 11,830,529, which is a continuation of application No. 17/177,549, filed on Feb. 17, 2021, now Pat. No. 11,386,923, which is a continuation of application No. 16/916,937, filed on Jun. 30, 2020, now Pat. No. 10,964,343, which is a continuation of application No. 16/560,240, filed on Sep. 4, 2019, now Pat. No. 10,734,018.

(56) References Cited

U.S. PATENT DOCUMENTS

| | | | | |
|---|---|---|---|---|
| 5,570,261 | A | * | 10/1996 | Frater ................. G11B 5/4833 |
| | | | | 360/244.3 |
| 5,617,274 | A | * | 4/1997 | Ruiz ..................... G11B 5/484 |
| | | | | 360/245.5 |
| 5,862,011 | A | | 1/1999 | Sega et al. |
| 5,986,852 | A | * | 11/1999 | Berg ................... G11B 5/4833 |
| | | | | 360/245.9 |
| 6,005,747 | A | * | 12/1999 | Gilovich ............. G11B 33/121 |
| 6,008,966 | A | * | 12/1999 | Forbord ............... G11B 33/022 |
| 6,147,834 | A | * | 11/2000 | Srikrishna ........... G11B 33/142 |
| | | | | 360/99.18 |
| 6,989,968 | B2 | | 1/2006 | Takasugi et al. |
| 7,113,371 | B1 | | 9/2006 | Hanna et al. |
| 7,817,379 | B2 | | 10/2010 | Hanya et al. |
| 10,734,018 | B1 | * | 8/2020 | Uehara ................ G11B 25/043 |
| 10,964,343 | B2 | * | 3/2021 | Uehara ................ G11B 5/4833 |
| 11,386,923 | B2 | * | 7/2022 | Uehara ................ G11B 25/043 |
| 11,830,529 | B2 | * | 11/2023 | Uehara ................ G11B 25/043 |
| 12,205,621 | B2 | * | 1/2025 | Uehara ................ G11B 25/043 |
| 2002/0093760 | A1 | * | 7/2002 | Okunaga ............. G11B 25/043 |
| 2003/0165033 | A1 | | 9/2003 | Sasaki |
| 2004/0231139 | A1 | | 11/2004 | Jurgenson |
| 2006/0161944 | A1 | * | 7/2006 | Edwards ............ G11B 23/0323 |
| | | | | 720/725 |
| 2008/0055773 | A1 | * | 3/2008 | Nigam ................. G11B 5/5569 |
| 2009/0027807 | A1 | | 1/2009 | Yao et al. |
| 2009/0279209 | A1 | | 11/2009 | Fujimoto et al. |
| 2010/0157481 | A1 | | 6/2010 | Kudo |
| 2020/0258540 | A1 | * | 8/2020 | Uehara ................ G11B 5/4833 |
| 2020/0327903 | A1 | * | 10/2020 | Uehara ................ G11B 5/4873 |
| 2021/0174828 | A1 | * | 6/2021 | Uehara ................ G11B 5/4826 |
| 2022/0301585 | A1 | * | 9/2022 | Uehara ................ G11B 5/4873 |
| 2024/0062778 | A1 | * | 2/2024 | Uehara ................ G11B 25/043 |
| 2025/0118331 | A1 | * | 4/2025 | Uehara ................ G11B 5/4833 |

FOREIGN PATENT DOCUMENTS

| | | | |
|---|---|---|---|
| JP | 200283475 | A | 3/2002 |
| JP | 3492197 | B2 | 2/2004 |
| JP | 2010146686 | A | 7/2010 |
| JP | 2011248931 | A | 12/2011 |
| WO | 2019004484 | A1 | 1/2019 |

* cited by examiner

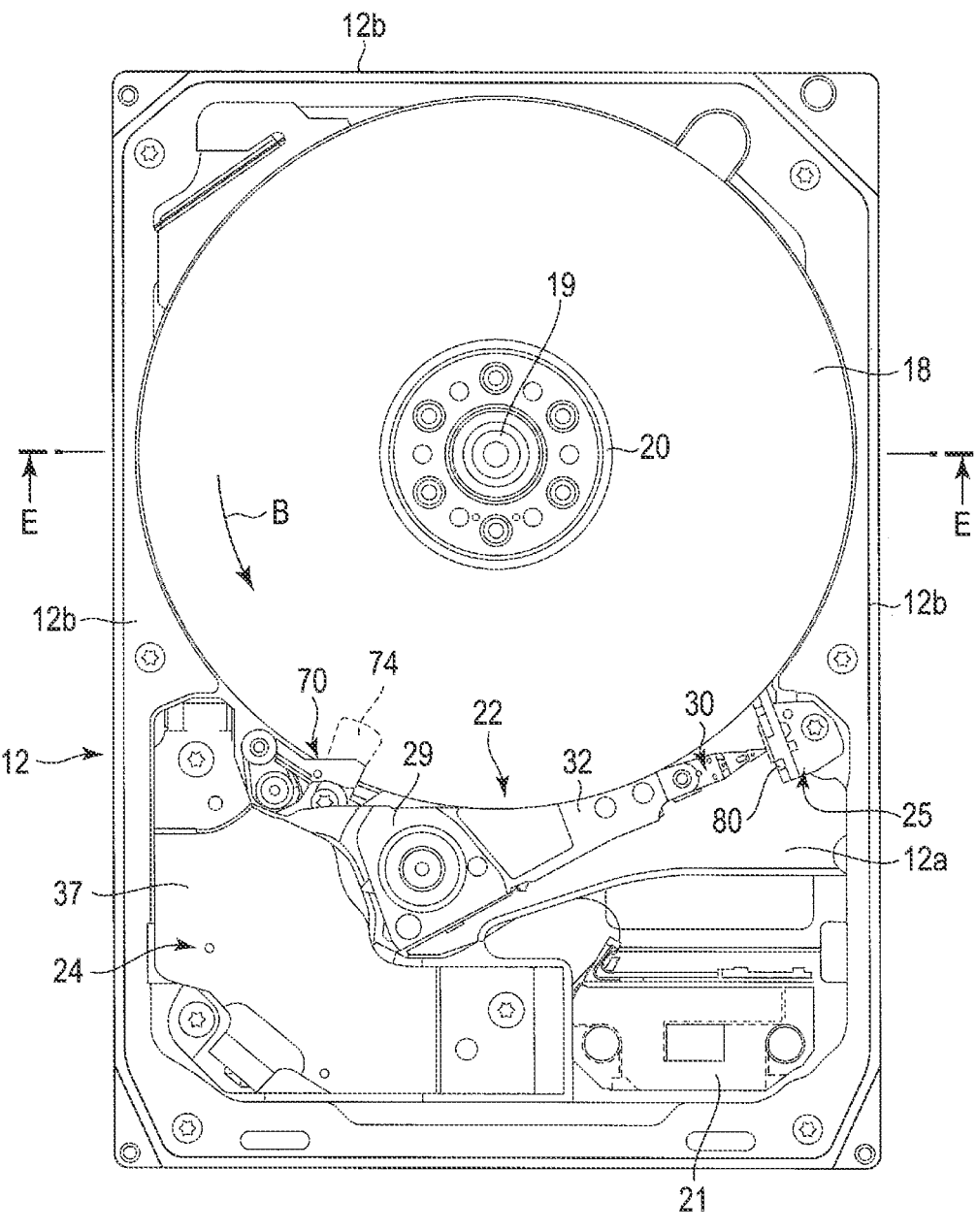
F I G. 2

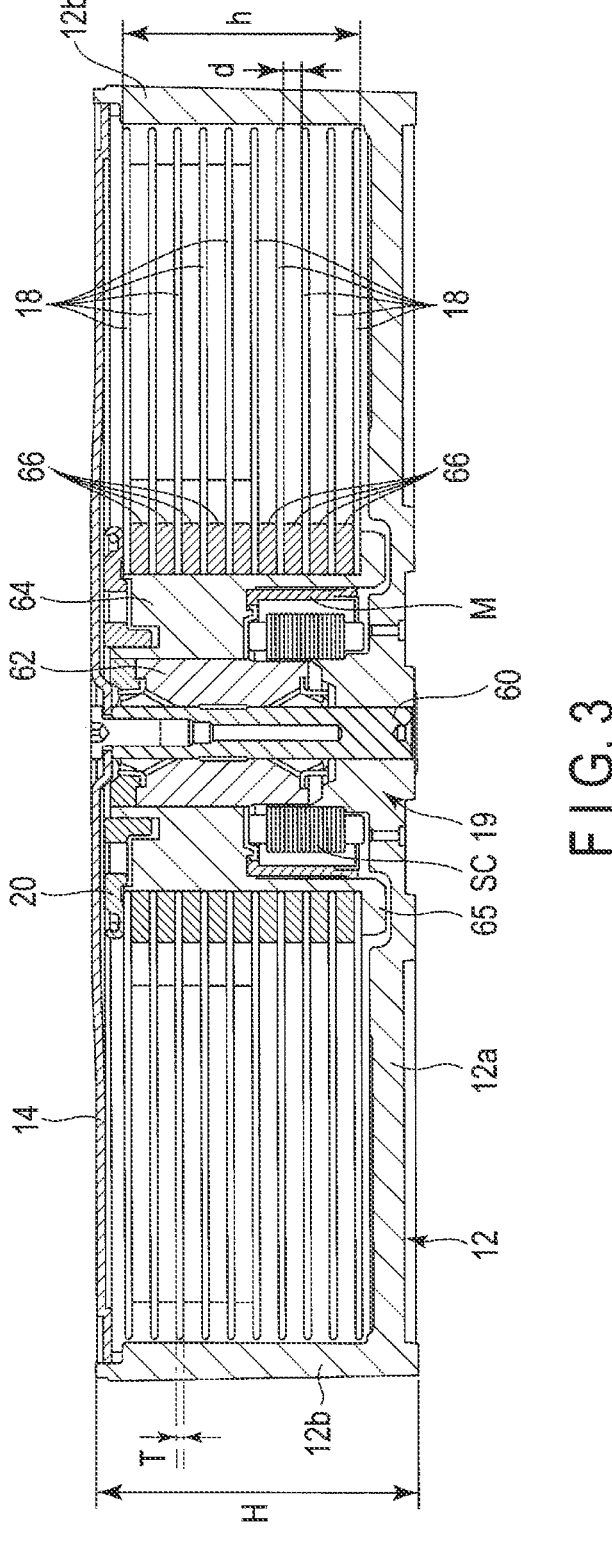
F I G. 3

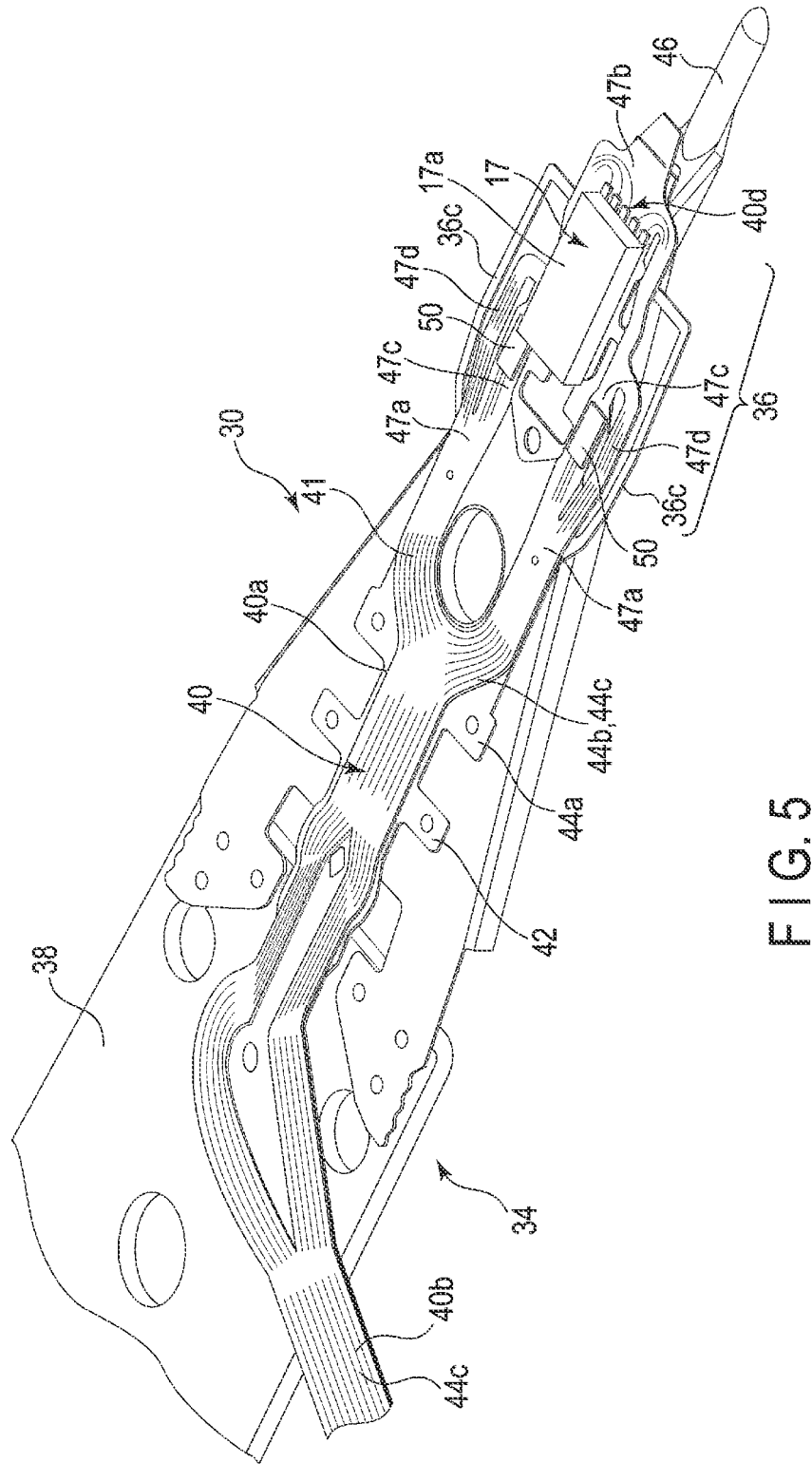
F I G. 5

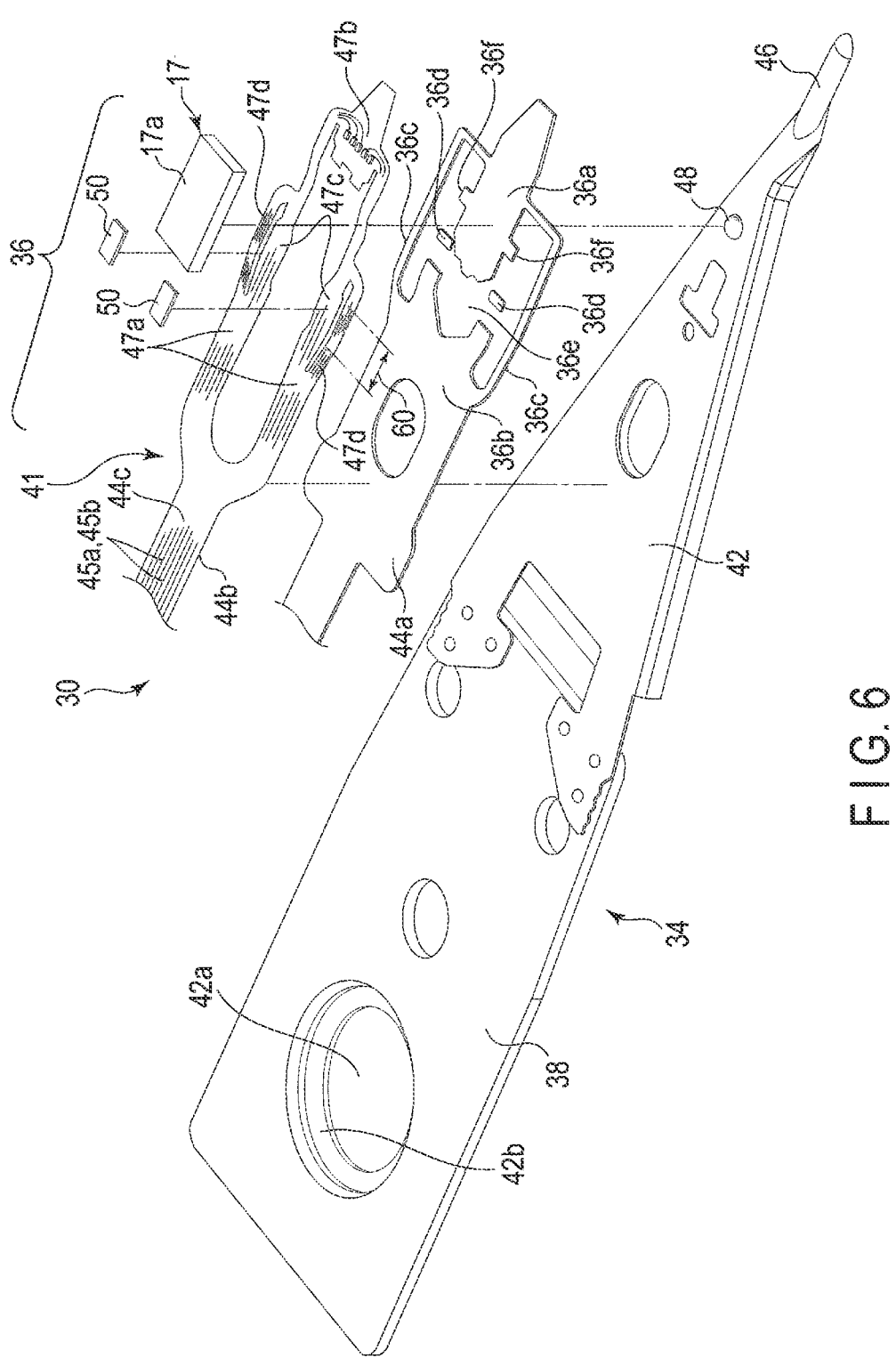
F I G. 6

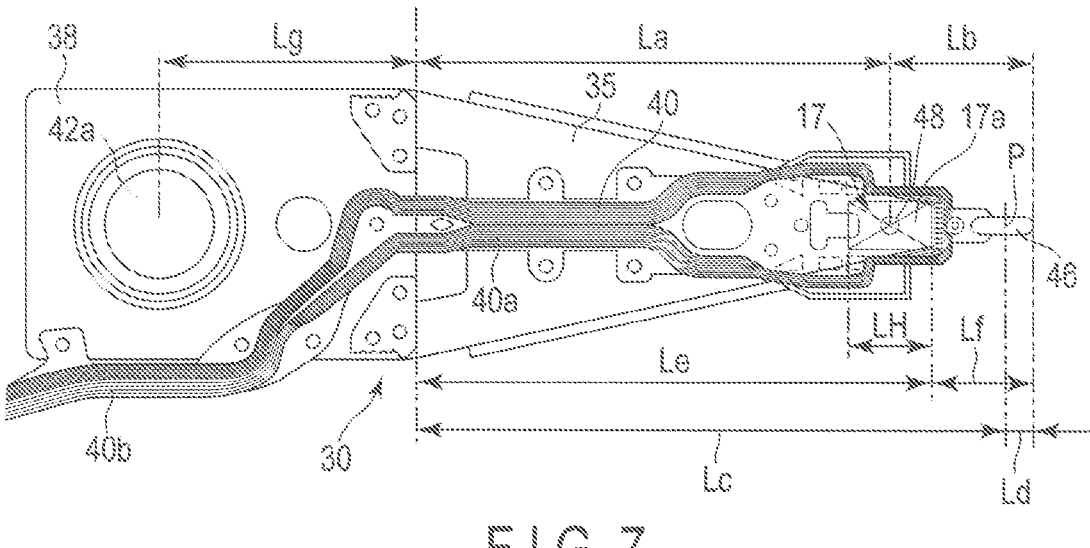
FIG.7
FIG.8
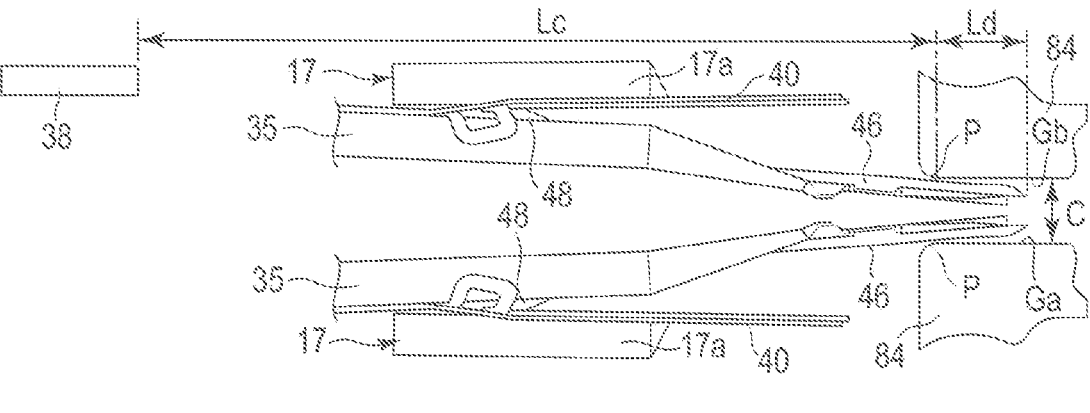
FIG.9

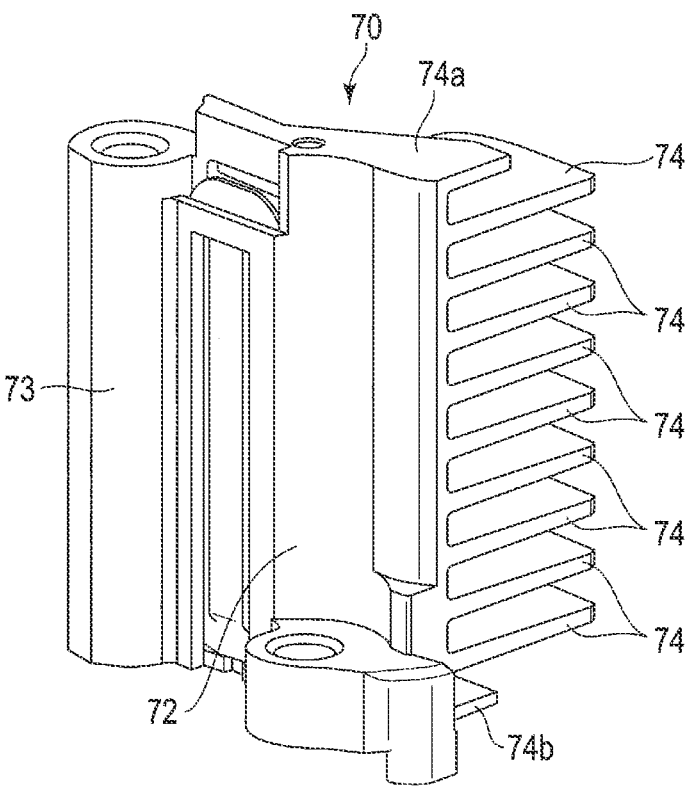
F I G. 12
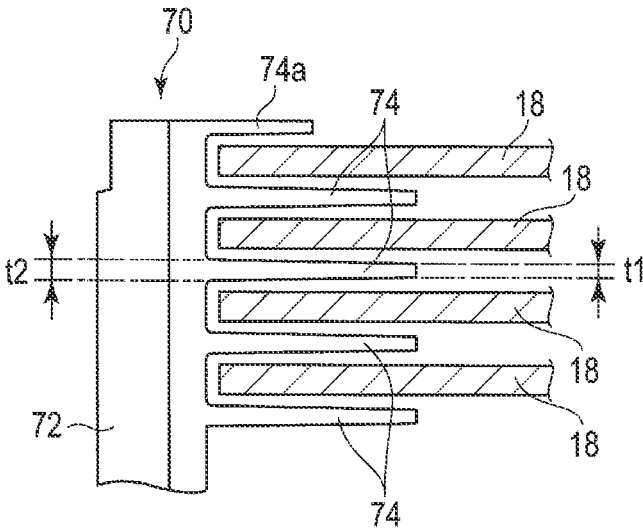
F I G. 13

DISK DEVICE

CROSS-REFERENCE TO RELATED APPLICATIONS

This application is a continuation of application Ser. No. 18/492,712 filed Oct. 23, 2023, which is a continuation of application Ser. No. 17/837,667 filed Jun. 10, 2022 (now U.S. Pat. No. 11,830,529) which is a continuation of application Ser. No. 17/177,549 filed Feb. 17, 2021 (now U.S. Pat. No. 11,386,923), which is a continuation of application Ser. No. 16/916,937 filed Jun. 30, 2020 (now U.S. Pat. No. 10,964,343), which is a continuation of application Ser. No. 16/560,240 filed Sep. 4, 2019 (now U.S. Pat. No. 10,734, 018) and is based upon and claims the benefit of priority from Japanese Patent Application No. 2019-020632, filed Feb. 7, 2019, the entire contents of each of which are incorporated herein by reference.

FIELD

Embodiments described herein relate generally to a disk device.

BACKGROUND

A disk device, for example, a hard disk drive (HDD) comprises a plurality of magnetic disks disposed to be rotatable in a housing, and a plurality of magnetic heads which read/write data from/to the magnetic disks, and a head actuator which supports the magnetic heads to be movable with respect to the respective magnetic disks.

The head actuator includes an actuator block supported to be rotatable, and a plurality of head suspension assemblies (also referred to as head gimbal assemblies) each extending from the actuator block and supporting the respective magnetic head in its distal end portion. The head suspension assemblies each includes a base plate one end of which is fixed to an arm, a load beam extending from the base plate, a tab extending from a distal end of the load beam and a flexure (wiring member) provided on the load beam and the base plate. The flexure includes a displaceable gimbal portion, and a respective magnetic head is supported on the gimbal portion. The load beam includes a pivot and the respective magnetic head is located to be overlaid on the pivot.

Moreover, the disk device comprises a ramped loading mechanism which holds a magnetic head at an unloading position spaced from the respective magnetic disk when the magnetic head moves to the outermost circumference of the magnetic disk. Usually, the ramped loading mechanism includes a ramp provided in the housing and the tab of the respective head suspension assembly. As each tab runs onto a corresponding step of the ramp, the magnetic head is held at the unloading position.

In the disk device, for example, when the magnetic head is loaded on a magnetic disk and the height of the base plate varies, a leverage movement occurs on the dimple as the fulcrum, thereby varying the height of the distal end of the tab. Or when the tab is on the ramp, a leverage movement occurs on a contact point (ramped loading point) between the ramp and the tab as the fulcrum, and the height of the distal end of the tab varies. These variations in the height of the distal end of the tab are likely to cause such problems as failure of the head unloading operation and crash of tabs locating back to back with respect to each other. In order to ensure reliable head loading and unloading operations, the diameters of the entrance and exit of the ramp and the distances between the entrances and between the exits must be enlarged so as to cope with the variations in the height of the distal end of the tab, which may be an obstacle when designing to reduce the height of a ramp and increase the number of magnetic disks.

BRIEF DESCRIPTION OF THE DRAWINGS

FIG. 2 is a plan view of the HDD while the cover is removed.

FIG. 3 is a cross sectional view of the HDD.

FIG. 5 is a perspective view showing the head suspension assembly of the head actuator assembly.

FIG. 6 is an exploded perspective view of the head suspension assembly.

FIG. 7 is a plan view of the head suspension assembly.

FIG. 8 is a side view schematically showing the head suspension assembly.

FIG. 9 is a side view showing an engagement state between a distal end portion of the head suspension assembly and a ramp.

FIG. 12 is a perspective view of a spoiler.

FIG. 13 is a cross sectional view of the spoiler.

DETAILED DESCRIPTION

Figure 1:
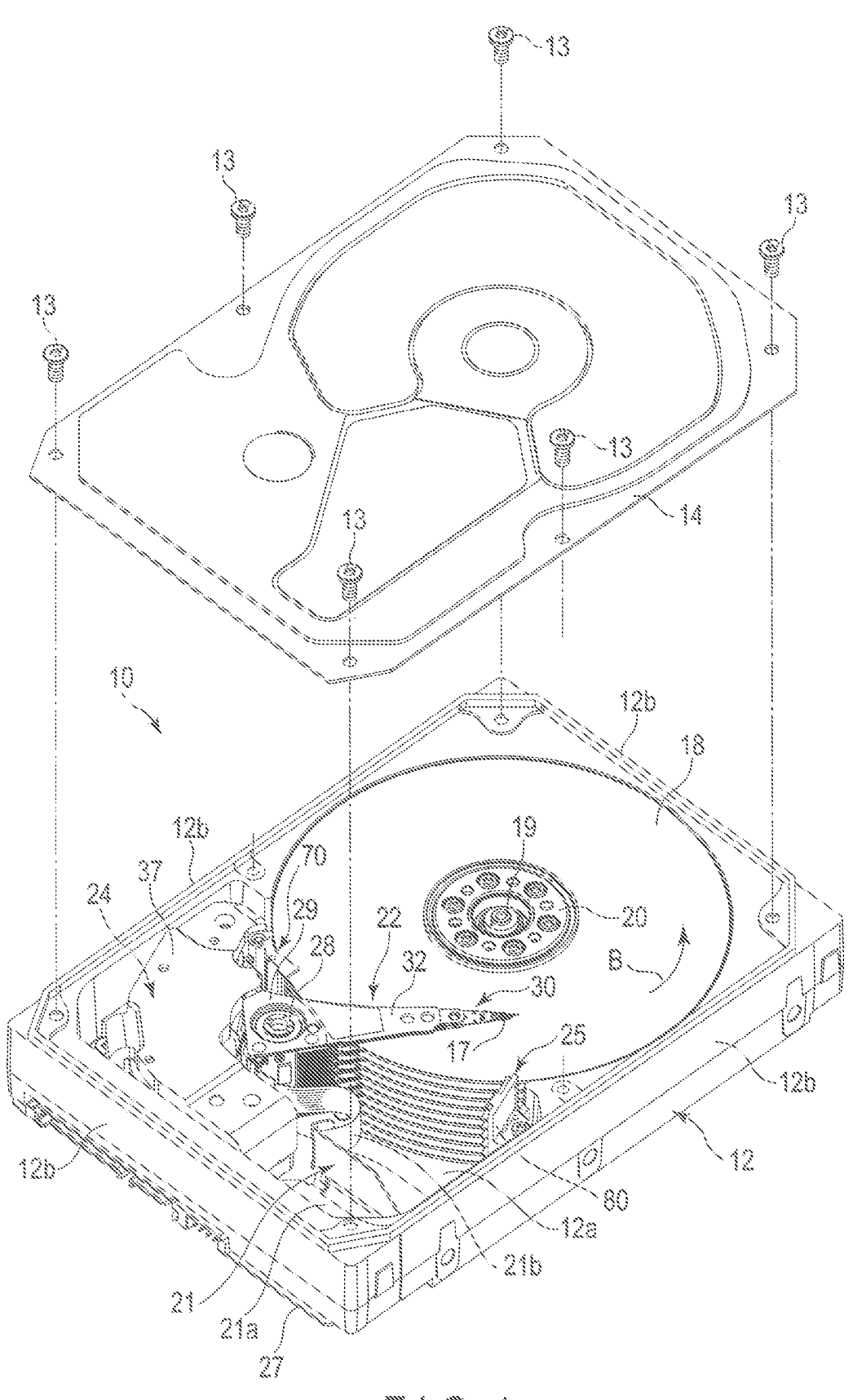
FIG. 1 is an exploded perspective view showing a base and a top cover of a hard disk drive (HDD) according to an embodiment.

Various embodiments will be described hereinafter with reference to the accompanying drawings. In general, according to one embodiment, a disk device comprises a housing; at least two rotatable magnetic disks disposed in the housing and opposing each other at intervals of 1.2 mm or more but 1.5 mm or less; and at least two suspension assemblies each supporting a magnetic head, and being movable in a space between the at least two magnetic disks. Each of the at least two suspension assemblies comprises a base plate, a load beam extending from the base plate and comprising a proximal end portion joined to the base plate and including a bendable location, and a distal end portion including a dimple, a tab extending from a distal end of the load beam, a wiring member comprising a gimbal portion and disposed on the load beam and the base plate, and a magnetic head mounted on the gimbal portion and abutting on the dimple via the gimbal portion. A ratio of a distance from the bendable location of the load beam to a center of the dimple with respect to a distance from the center of the dimple to a tip of the tab being set to 2.8 or more but 3.8 or less.

What is disclosed in this specification is merely an example. Appropriate modifications which can be easily conceived by a person ordinarily skilled in the art without departing from the spirit of the embodiments naturally fall within the scope of the present invention. To further clarify explanation, for example, the width, thickness or shape of each structure may be schematically shown in the drawings compared with the actual forms. Note that the drawings are merely examples and do not limit the interpretation of the present invention. In the specification and drawings, elements which are identical to those of the already-mentioned figures are denoted by the same reference numbers. Thus, the detailed explanation of such elements may be omitted.

Embodiments

A hard disk drive (HDD) according to an embodiment as a disk device will be described in detail.

FIG. 1 is an exploded perspective view of the HDD according to the embodiment while a cover being removed, and FIG. 2 is a plan view of the HDD while the cover is removed.

As shown in FIG. 1, the HDD comprises a rectangular housing 10. The housing 10 includes a rectangular box-shaped base 12, an upper surface of which is opened, and a cover (top cover) 14. The base 12 comprises a rectangular bottom wall 12a and side walls 12b provided along a peripheral edge of the bottom wall 12a, which are formed of aluminum, for example, integrally as one body. The cover 14 is, for example, formed of stainless steel into a rectangular plate shape. The cover 14 is screwed with a plurality of screws 13 onto the side walls 12b of the base 12 so as to airtightly close the top opening of the base 12.

As shown in FIGS. 1 and 2, in the housing 10, a plurality of, for example, ten magnetic disks 18 as disk-shaped recording media, and a spindle motor 19 which supports and rotates the magnetic disks 18 are accommodated. The spindle motor 19 is arranged on the bottom wall 12a. Each magnetic disk 18 comprises a substrate formed into a disk shape with a diameter of, for example, 95 mm (3.5 inches), from a nonmagnetic material, for example, glass, and magnetic recording layers formed respectively on an upper surface (first surface) and a lower surface (second surface) of the substrate. The magnetic disks 18 are fitted coaxially with each other on a hub (which will be described later) of the spindle motor 19, and are clamped by a clamp spring 20. In this manner, the magnetic disks 18 are supported to be located parallel to the bottom wall 12a of the base 12. The magnetic disks 18 are rotated by the spindle motor 19 in a direction indicated by an arrow B at predetermined rotation speed. Note that the number of magnetic disks 18 loaded is not limited to ten, but may be nine or less, or ten or more but twelve or less.

In the housing 10, a plurality of magnetic heads 17, which record and reproduce information on and from the magnetic disks 18, and an actuator assembly 22, which supports the magnetic heads 17 to be movable with respect to the magnetic disks 18, are provided.

Further, the housing 10 accommodates a voice coil motor (VCM) 24 which rotates and positions the actuator assembly 22, a ramped loading mechanism 25 which holds the magnetic heads 17 at an unloading position spaced away from the magnetic disks 18 when a magnetic head 17 are moved to the outermost circumference of the respective magnetic disk 18, a board unit (FPC unit) 21 on which electronic components including a conversion connector are mounted, and a spoiler 70.

A printed circuit board 27 is screwed to an outer surface of the bottom wall 12a of the base 12. The printed circuit board 27 controls the operation of the spindle motor 19, and also constitutes a controller which controls the operation of the VCM 24 and the magnetic heads 17 via the board unit 21.

FIG. 3 is a cross-sectional view of the HDD taken along line E-E in FIG. 2. For example, the spindle motor 19 comprises a pivot shaft 60 which stands substantially straight up on the bottom wall 12a, a cylindrical rotation shaft 62 supported to be rotatable around the pivot shaft 60, a substantially cylindrical hub 64 fixed coaxially around the rotation shaft 62, a stator coil SC fixed to the bottom wall 12a and located around the rotation shaft 62, and a cylindrical magnet M attached on an inner circumferential surface of the hub 64 and opposing the stator coil SC. The hub 64 comprises an outer circumferential surface located coaxially with the pivot shaft 60, and an annular flange 65 formed integrally in a lower end (an end on a bottom wall 12a side) of the outer circumferential surface.

The magnetic disks 18 are engaged with the outer circumferential surface of the hub 64 while the hub 64 being inserted through the inner holes of the magnetic disks 18. Annular spacer rings 66 are mounted on the outer circumferential surface of the hub 64, and each of the rings 66 is interposed between each respective adjacent pair of two magnetic disks 18. The magnetic disks 18 and the spacer rings 66 are arranged in order on the flange 65 of the hub 64, and are attached to the hub 64 in an alternately overlapping manner. As the clamp spring 20 attached to the upper end of the hub 64 presses inner peripheral portions of the magnetic disks 18 and the spacer rings 66 towards the flange 65 side, the magnetic disks 18 are fixed in a stacked manner while maintaining predetermined intervals therebetween. Thus, the ten magnetic disks 18 are integrally supported by the rotation shaft 62 and the hub 64 so as to be rotatable therewith. The ten magnetic disk 18 are supported parallel to each other with predetermined intervals therebetween and substantially parallel to the bottom wall 12a.

The housing 10 is formed to have a height (thickness) H of a maximum of 26.1 mm in accordance with the HDD standard. The magnetic disks 18 are each formed to have a thickness T of 0.35 mm or more but 0.5 mm or less, and in this embodiment, it is set to 0.5 mm. The interval d (equivalent to the thickness of the spacer rings) between each adjacent pair of two magnetic disks 18 is set to 1.2 mm or more but 1.5 mm or less, and in this embodiment, it is set to 1.484 mm. The stacking height h of all the magnetic disks (the height from the lower surface of the lowermost magnetic disk to the upper surface of the uppermost magnetic disk) is set to 18.356 mm in this embodiment. The stacking height h of this embodiment is maintained substantially equivalent to the stacking height of a comparative case where nine magnetic disks each having a thickness of 0.635 mm and spacer rings having a thickness of 1.58 mm are stacked.

Figure 4:
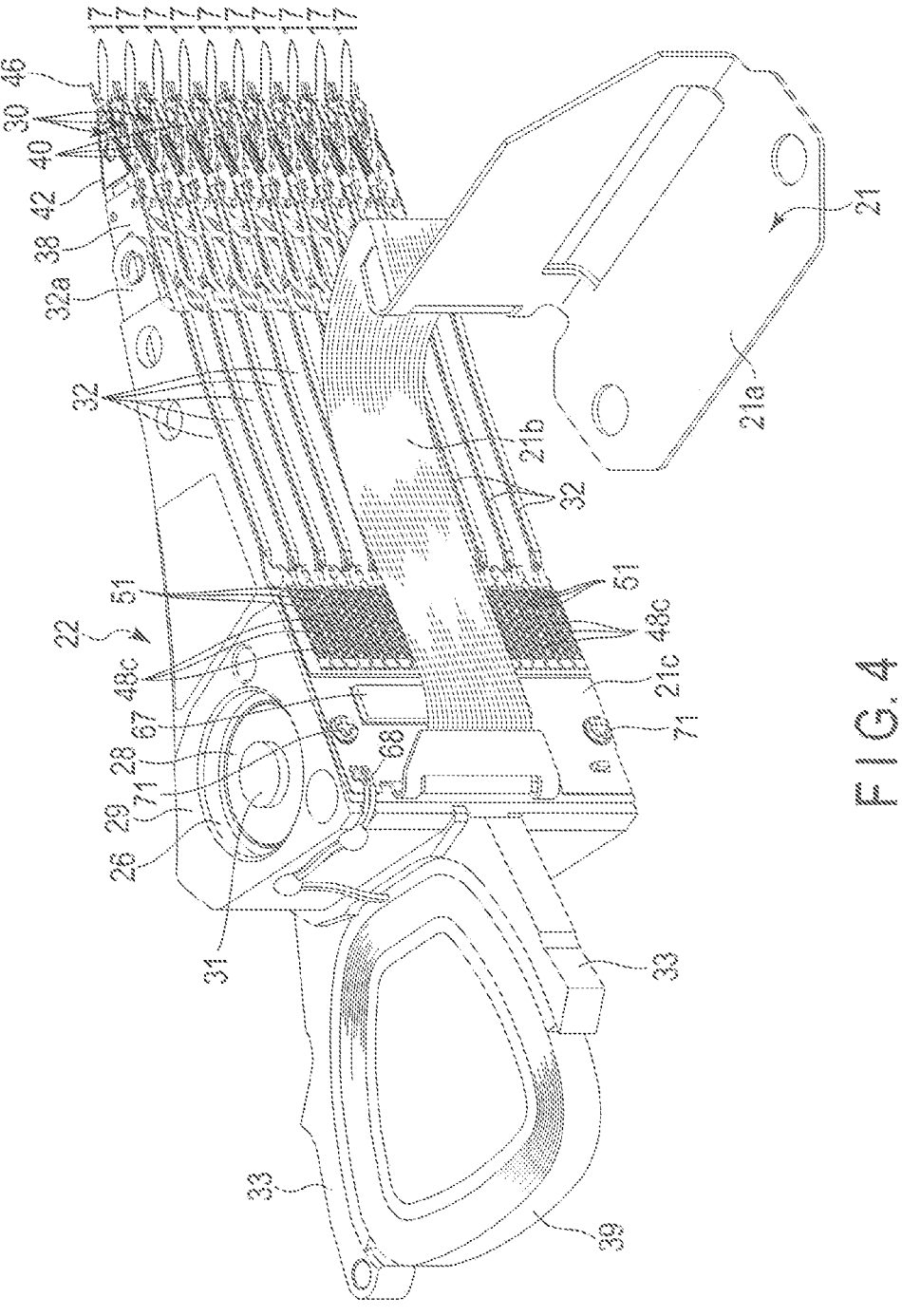
FIG. 4 is a perspective view showing a head actuator assembly and an FPC unit of the HDD.

FIG. 4 is a perspective view showing the actuator assembly. As shown, the actuator assembly 22 comprises an actuator block 29 with a through hole 26, a bearing unit (unit bearing) 28 provided in the through hole 26, a plurality of, for example, eleven arms 32 each extending from the actuator block 29, suspension assemblies (head gimbal assemblies, which may be referred to as HGA) 30 attached respectively to the arms 32, and magnetic heads 17 supported respectively by the suspension assemblies 30. A support shaft (axis) 31 is provided to stand on the bottom wall 12a of the base 12. The actuator block 29 is supported to be rotatable around the support shaft 31 with the bearing unit 28.

In this embodiment, the actuator block 29 and the 11 arms 32 are formed integrally as one body of aluminum or the like, and constitute the so-called E block. The arms 32 are each formed, for example, into a long and slender plate shape and so as to extend from the actuator block 29 in a direction normal to the support shaft 31. The eleven arms 32 are provided parallel to each other at intervals therebetween.

The actuator assembly 22 includes a support frame 33 extending from the actuator block 29 in a direction opposite to the arms 32, and the support frame 33 supports the voice coil 39 which is a part of the VCM 24. As shown in FIG. 1, the voice coil 39 is located between a pair of yokes 37, one of which is fixed on the base 12, and constitutes the VCM 24 together with these yokes 37 and a magnet fixed to one of the yokes 37.

As shown in FIG. 4, the actuator assembly 22 comprises twenty suspension assemblies 30 which respectively support the magnetic heads 17. The suspension assemblies 30 are each attached to extending ends 32a of the respective arms 32. The suspension assemblies 30 include head-up suspension assemblies which support the respective magnetic heads 17 upward and head-down suspension assemblies which support the respective magnetic heads 17 downward. These head-up suspension assemblies and head-down suspension assemblies can be constituted by changing the disposition of the suspension assemblies 30 of the same structure upward or downward.

In this embodiment, as shown in FIG. 4, a head-down suspension assembly 30 is attached to the uppermost arm 32, and a head-up suspension assembly 30 is attached to the lowermost arm 32. A head-up suspension assembly 30 and a head-down suspension assembly 30 are attached to each of the nine arms 32 in the middle.

The suspension assemblies 30 each include a substantially rectangular base plate 38, a load beam 42 formed from a long and slender flat spring, and a long and slender belt-shaped flexure (a wiring member) 40. The flexure 40 comprises a gimbal portion, which will be described later, and the respective magnetic head 17 is mounted on the gimbal portion. A proximal end portion of the base plate 38 is fixed to the extending end 32a of the respective arm 32 by, for example, swaging. The load beam 42 is fixed by the proximal end portion thereof to the end portion of the base plate 38 to overlap each other. The load beam 42 is formed to extend from the base plate 38 and to narrow down toward the extending end. The base plate 38 and the load beam 42 are formed of, for example, stainless steel.

The load beam 42 produces a spring force (reaction force) which urges the respective magnetic head 17 towards the surface of the respective magnetic disk 18. Moreover, the tab 46 projects out from the tip of the load beam 42. The tab 46 is engageable with the ramp, which will be described later, and it constitutes the ramped loading mechanism 25 with the ramp.

As shown in FIG. 4, the FPC unit 21 includes a substantially base portion 21a bent into an L-shape, a long and slender belt-like relay portion 21b extending from one side edge of the base portion 21a, and a junction 21c formed continuously to the tip of the relay portion 21b, which are all integrated into one body. The base portion 21a, the relay portion 21b and the junction 21c are formed from a flexible printed circuit board (FPC). The flexible printed circuit board comprises an insulating layer such as of polyimide, a conductive layer a plurality of wiring lines, connection pads and the like, formed on the insulating layer, and a protective layer covering the conductive layer.

On the base portion 21a, electronic parts (not shown) such as conversion connectors and capacitors are mounted, and they are electrically connected to the wiring lines (not shown). A metal plate, which functions as a reinforcing board is adhered on the base portion 21a. The base portion 21a is provided on the bottom wall 12a of the base 12. The relay portion 21b is formed to extend from a side edge of the base portion 21a toward the actuator block 29 of the actuator assembly 22. The junction 21c provided in the extending end of the relay portion 21b is formed into a rectangular shape having a height and width substantially equal to those of the side surface (setting surface) of the actuator block 29. The junction 21c is adhered on the setting surface of the actuator block 29 via a lining plate formed of aluminum or the like, and further fixed to the setting surface with fixation screws 71. A great number of connection pads are formed on the junction 21c. For example, one head IC (head amplifier) 67 is mounted on the junction 21c, and the head IC 67 is connected to the connection pads and the base portion 21a via wiring lines. Further, in the junction 21c, connection terminals 68, to which the voice coil 39 is connected, are formed.

The flexure 40 of each suspension assembly 30 includes one end portion electrically connected to the magnetic head 17, another end portion extending to the actuator block 29 through a groove formed in a side edge of the arm 32, and a connection end portion (tail connection terminal portion) 48c provided in the other end. The connection end portion 48c is formed into a long and slender rectangular shape. On the connection end portion 48c, a plurality of, for example, thirteen connection terminals (connection pads) 51 are provided. These connection terminals 51 are connected to the wiring lines of the flexure 40, respectively. More specifically, a plurality of wiring lines of the flexure 40 extend over substantially a full length of the flexure 40, and electrically connected to the magnetic head 17 by one-side ends and also connected to the connection terminal (connection pad) 51 by the other-side ends.

The connection terminal 51 provided in the connection end portion 48c of each of the twenty flexures 40 is joined to the connection pad of the junction 21c, and through the connection pad, is electrically connected to the wiring lines of the junction 21c. Thus, the twenty magnetic heads 17 of the actuator assembly 22 are each electrically connected to the base portion 21a via the wiring lines of the respective flexure 40, the connection end portion 48c, the junction 21c of the FPC unit 21 and the relay portion 21b.

In the state where the actuator assembly 22 configured as above is incorporated on the base 12, the support shaft 31 is set substantially parallel to the spindle of the spindle motor 19. Each magnetic disk 18 is located between two adjacent suspension assemblies 30. In the operation of the HDD, the magnetic heads 17 supported by the two respective suspension assemblies 30 face the upper surface and the lower surface of the respective magnetic disks 18.

Next, the structures of the suspension assemblies 30 will be explained in detail.

FIG. 4 is a perspective view of each suspension assembly and FIG. 5 is a decomposed perspective view of the gimbal portion of the suspension assembly.

As shown in FIGS. 5 and 6, the suspension assembly 30 comprises a suspension 34 which functions as a support plate. The suspension 34 includes a rectangular base plate 38 formed of a metal plate having a thickness of several hundreds of microns, and a load beam 35 formed of a metal plate having a thickness of tens of microns into a shape of a long and slender spring. The load beam 42 comprises a proximal end portion stacked on a distal end portion of the base plate 38, and is fixed to the base plate 38 by welding a plurality of locations in the load beam 42. The proximal end portion of the load beam 42 has a width substantially equal to that of the base plate 38. A long and slender rod-shaped tab 46 is provided to protrude in the distal end of the load beam 42.

The base plate 38 includes, at a proximal end portion thereof, a circular opening 42a, and annular protrusion 42b positioned around the opening 42a. By fitting the protrusion 42b of the base plate 38 in the circular caulking hole (not shown) formed in the seating face for caulking provided on the arm 32, and caulking the protrusion 42b, the base plate 38 is fastened to the distal-end portion of the arm 32. The distal end of the base plate 38 may be fixed to the distal end of the arm 32 by laser welding, spot welding or adhesion.

The suspension assembly 30 comprises a pair of piezo-electric elements (PZT elements) 50 and a long and slender belt-like flexure (wiring member) 40 configured to transmit recording signals and reproduction signals and drive signals for the piezoelectric elements 50. The flexure 40 comprises a distal end portion 40a mounted on the load beam 42 and the base plate 38. The rear-half portion (extending portion) 40b extends outwardly from a side edge of the base plate 38 and along a side edge of the arm 32. The connection end portion 48c located at the distal end of the extending portion 40b is connected to the junction 21c of the FPC unit 21 described above.

The distal end portion of the flexure 40, which is located on the distal end portion of the load beam 42, forms the gimbal portion 36 functioning as an elastic supporting member. The magnetic head 17 is mounted and fixed on the gimbal portion 36, and is supported on the load beam 42 through the gimbal portion 36. The pair of piezoelectric elements 50 functioning as drive elements are attached to the gimbal portion 36, and located on the proximal end side of the load beam 42 with respect to the magnetic head 17.

The flexure 40 comprises a thin metal plate (metal plate) 44a of stainless steel or the like, used as a base and a belt-shaped multilayered member 41 attached or fixed on the thin metal plate 44a, which are shaped into a slim multilayer plate. The multilayered member 41 comprises a base insulating layer 44b most of which is fixed to the thin metal plate 44a, a conductive layer (wiring pattern) 44c formed on the base insulating layer 44b and constituting a plurality of signal wiring lines 45a and drive wiring lines 45b, and a cover insulating layer stacked on the base insulating layer 44b to cover the conductive layer 44c. The distal end portion 40a of the flexure 40 is attached, by its thin metal plate 44a side, to the surfaces of the load beam 42 and the base plate 38, or welded thereto by spot welding by a plurality of welding points.

In the gimbal portion 36, the thin metal plate 44a includes a rectangular tongue portion (support portion) 36a located in the distal end side, a substantially rectangular proximal end portion (rear end plate portion) 36b located on the proximal end side so as to interpose the tongue portion 36a and a space portion 36e, a pair of long and slender outriggers (link portions) 36c extending from the tongue portion 36a to the proximal end portion 36b, a pair of island-like separation plate members 36d provided in the space portion 36e between the tongue portion 36a and the proximal end portion 36b, and a pair of handles (supporting projections) 36f projecting from both side edges of the tongue portion 36a respectively to both sides thereof.

The proximal end portion 36b is attached onto the surface of the load beam 42, or fixed thereto by spot welding. The tongue portion 36a is formed to have such size and shape, for example, a rectangular, that can accommodate the magnetic head 17. The tongue portion 36a is arranged such that its widthwise central axis is coincident with a central axis of the suspension 34. A substantially central portion of the tongue portion 36a is in contact with a dimple (convex portion) 48 projectingly provided at the distal end portion of the load beam 42. Further, the tongue portion 36a can be displaced in various directions with respect to the dimple 48 as its fulcrum as the pair of outriggers 36c elastically deform. With this structure, the tongue portion 36a and the magnetic head 17 mounted on the tongue portion 36a are able to flexibly follow the surface fluctuation of the magnetic disk 18 in rolling and pitching directions, thereby making it possible to maintain a narrow gap between the surface of the respective magnetic disk 18 and the magnetic head 17. The pair of handles 36f are formed from the thin metallic plate 44a integrally with the tongue portion 36a, and project from the both side edges of the tongue portion 36a in a direction substantially perpendicular to the center axis. Note that the handles 36f may be formed from, not only the thin metal plate 44a itself, but also the conductive layer 44c, the base insulating layer 44b or the cover insulating layer 44d stacked on the thin metal plate 44a.

In the gimbal portion 36, a portion of the multilayered member 41 of the flexure 40 separates into two parts, which are located on both sides of the central axis of the suspension 34. The multilayered member 41 includes a proximal end portion 47a fixed on the proximal end portion 36b of the thin metal plate 44a, a distal end portion 47b attached on the tongue portion 36a, a pair of belt-like first bridge portions 47c extending from the proximal end portion 47a to the distal end portion 47b on through the separation plate member 36d, a pair of belt-like second bridge portions (branching portion) 47d extending from the proximal end portion 47a, respectively, along and halfway through the first bridge portions 47c and then joining to the first bridge portions 47c, respectively. The first bridge portions 47c form a mounting portion in which the piezoelectric elements 50 are to be mounted. The first bridge portions 47c are located abreast with the outriggers 36c on the both sides of the tongue portion 36a, and extend in substantially parallel to the central axis of the suspension 34, i.e., along the longitudinal direction of the load beam 42. Further, the first bridge portions 47c extend over the handles 36f and cross-bars of the outriggers 36c, and are partially fixed thereto. Furthermore, the first bridge portions 47c are arranged so that the proximal end side portions, the distal en side portion and the middle portions thereof are located on the thin metal plate 44a.

Each of the second bridge portions 47d is located between the respective first bridge portion 47c and the respective outrigger 36c and extends abreast therewith. The second bridge portions 47d join the respective first fridge portions 47c in the vicinities of the handles 36f. The second bridge portions 47d are located off the thin metal plate 44a, and not provided on top of the thin metal plate 44a.

Each magnetic head 17 includes a substantially rectangular slider 17a, and is fixed to the tongue portion 36a by an adhesive. The magnetic head 17 is arranged so that the longitudinal central axial line thereof coincides with the central axis of the suspension 34, and further the substantially central portion of the magnetic head 17 is located above the dimple 48. Record and reproduction elements of the magnetic head 17 are electrically joined to a plurality of electrode pads 40d of the distal end portion 47b by soldering or a conductive adhesive such as a sliver paste. Thus, the magnetic head 17 is connected to the signal wiring lines 45a via the electrode pads 40d.

As the pair of piezoelectric elements 50, for example, rectangular plate-shaped thin film piezoelectric elements (PZT elements) are adopted. The piezoelectric elements 50 are not limited to a thin film type (a thickness of about 10 μm), but a bulk type or a bulk lamination type (a thickness of 50 μm or more) of piezoelectric elements may be applied as the piezoelectric elements 50. Alternatively, not only PZT elements but other types of piezoelectric elements may be used as the piezoelectric elements 50. Further, as the driver elements, not only piezoelectric elements but other types which can be expanded and contracted by application of current may be used.

The piezoelectric elements 50 are adhered to upper surfaces of the first bridge portions 47c, respectively, with adhesives or the like. The piezoelectric elements 50 are each disposed so that the longitudinal direction (expansion/contraction direction) thereof is parallel to the longitudinal direction of the load beam 42 and the respective first bridge portion 47c. The two piezoelectric elements 50 are arranged to be parallel to each other and also displaced to the proximal end portion 47a side of the multilayered member 41 with respect to the magnetic head 17 on both sides of the magnetic head 17. Note that the piezoelectric elements 50 may be arranged to incline towards the longitudinal directions of the respective first bridge portions 47c, and for example, the two piezoelectric elements 50 may be arrange in crossing directions such as a V-shape formation.

Each of the piezoelectric elements 50 is attached to the respective first bridge portion 47c in such a state that one-side longitudinal (expanding/contracting direction) end portions thereof overlap the proximal end portion 36b of the thin metal plate 44a and the other-side longitudinal end portions overlap the respective separation plate 36d. Each piezoelectric element 50 is electrically connected to the drive wiring lines 45b which transmit drive signals.

FIG. 7 is a plan view schematically showing dimensional relationship between members of the suspension assembly 30, and FIG. 8 is a side view schematically showing the suspension assembly.

According to this embodiment, as shown in FIG. 7, a distance La from the tip of the base plate 38 to the dimple 48 is set greater, and a distance Lb from the dimple 48 to the tip of the tab 46 is set shorter as compared to comparative examples. Thus, it becomes possible to suppress the height variation Hv of the top of the tab 46, caused by the variation in height of the base plate 38, to low level.

For example, the distance La from the tip of the base plate 38 to the center of the dimple 48 is 7.0075 mm (in a comparative example, it is 5.5075 mm), whereas the distance Lb from the center of the dimple 48 to the tip of the tab 46 is 2.167 mm (in the comparative example, it is 2.467 mm), and La/Lb is 3.23 (in the comparative example, 2.23). Note that the center of the dimple 48, which serves one starting point of the distance La, indicates an apex portion of the dimple 48 or the location where the dimple 48 abuts on the tongue portion 36a (the magnetic head 17). The tip of the base plate 38, which serves as the other starting point of the distance La, is an end edge of the base plate 38, which is most close to the magnetic head. Substantially, the other starting point of the distance La is a bendable location where the load beam 35 bends and deforms in a proximal end of the load beam 35, and the magnetic head-side end edge of the region where the load beam 35 is joined to the base plate 38 serves as a reference position. In this embodiment, the load beam 35 is spot-welded to the base plate 38, and therefore it is considered that the load beam bends and deforms at a bendable location of an end edge of the welded portion, which is most close to the magnetic head. The end edge of the welded portion, which is most close to the magnetic head, and the end edge of the base plate 38 are located to be adjacent to each other, and further the gap therebetween is considered to be set at a constant value. Therefore, in this embodiment, the bendable location where the load beam 35 bends and deforms is referred to be substantially the same as the tip edge of the base plate 38 (the magnetic head-side tip edge).

When the distance La and Lb are set as described above, as shown in FIG. 8, the height variation Hv of the tip of the tab 46 with respect to the case where the height variation Hh of the tip of the base plate 38 is 100 μm, is 30.9 μm (in the comparative example, 44.8 μm).

It is desirable that the distances La and Lb should be set such that the ratio between these distances, La/Lb is in a range of 2.8 to 3.8. By the portion that the distance La from the tip of the base plate 38 to the center of the dimple 48 is increased, the length of the base plate 38 is shortened, and thus a distance Lg from the tip of the base plate 38 to the position where the base plate 38 is fixed, that is, the center of the opening 42a, is set to about 3.8 mm (in the comparative example, 5.3 mm).

A distance Ld from the position (a ramp loading point P) where the slope of the ramp, which will be described later, and the tab 46, to the tip of the tab 46 is 0.45 mm, and a distance Lc from the tip of the base plate 38 to the ramp loading point P is 8.725 mm (in a comparative technique, it is 7.525 mm), and Lc/Ld is 19.41 (in the comparative technique, it is 16.74). It is desirable that the distances Lc and Ld should be set such that the ratio between these distances, Lc/Ld, be in a range of 18 to 21. Thus, in the state where the tab 46 is in contact with the ramp, and when the height variation Hh of the tip of the base plate 38 is 100 μm, the height variation Hv of the tip of the tab 46 is 5.2 μm (in the comparative technique, it is 6 μm).

In another example, a distance Le from the tip of the base plate 38 to the tip (outflow end) of the magnetic head 17 is 7.625 mm (in the comparative example, it is 6.125 mm), and a distance Lf from the tip (outflow end) of the magnetic head 17 to the tip of the tab 46 is 1.55 mm (in the comparative example, it is 1.85 mm). In this embodiment, the magnetic head 17 includes a Pemto slider 17a, which has a length LH of 1.235 mm. It is desirable that the distances Le and Lf should be set such that the ratio between these distances, Le/Lf, be in a range of 4 to 6.

Next, the ramp of the ramped loading mechanism 25 and the arrangement of the ramp and the suspension assembly with relation to each other will be described in detail. FIG. 9 is a side view showing an engagement state of the distal end portion of the suspension assembly and the ramp, FIG. 10 is a perspective view showing the ramp of the ramped loading mechanism, and FIG. 11 is a side view schematically showing an entrance/exit (beak-shaped portion) of the ramp.

The ramped loading mechanism 25 comprises a ramp 80. As shown in FIG. 1, the ramp 80 is fixed to the bottom wall 12a of the base 12, and is located near the circumferential portions of the magnetic disks 18. While the HDD is not in operation, if the magnetic heads 17 move off from the outer circumference of the magnetic disks 18 to a predetermined stop position, the tabs 46 of the suspension assemblies 30 climb up the ramp 80. Thus, the magnetic heads 17 can be held in a position off the magnetic disks 18.

Figure 10:
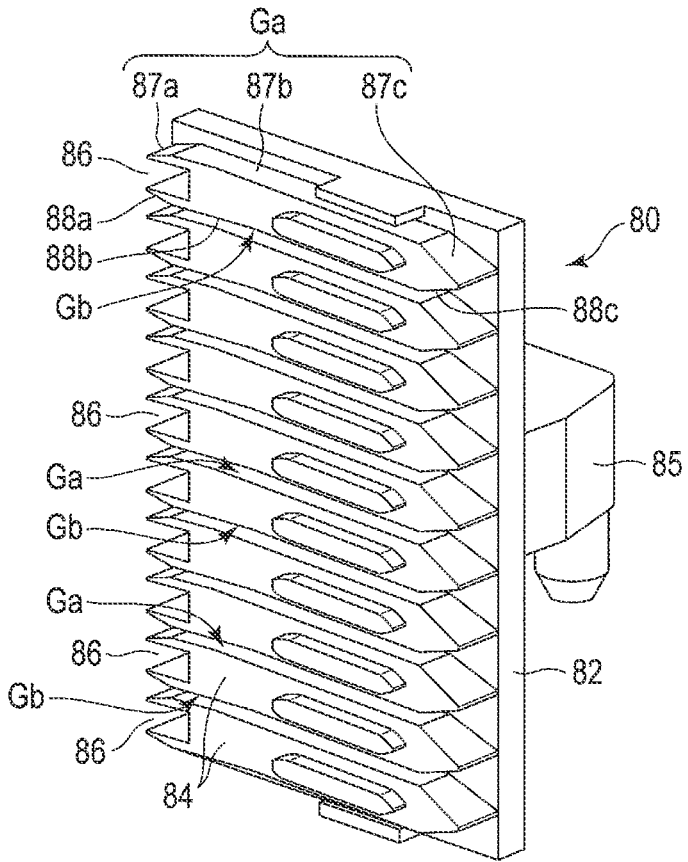
FIG. 10 is a perspective view of the ramp.
Figure 11:
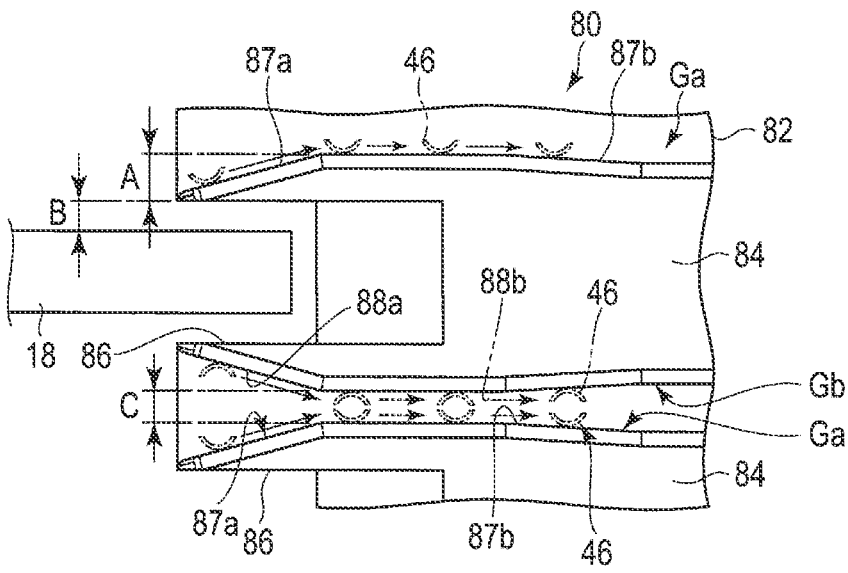
FIG. 11 is an expanded side view of a beak-shaped portion (an entrance-section) of the ramp.

As shown in FIG. 10, the ramp 80 includes a ramp body 82 formed into a rectangular plate shape, ten guide blocks 84 formed to project from one whole surface of the ramp body 82, and a support bracket 85 formed to project from another surface of the ramp body 82, which are formed, for example, of a synthetic resin or metal into one integral body. By fixing the support bracket 85 to the base 12, the ramp body 82 is disposed to rise up straight substantially perpendicular to the bottom wall 12a of the base.

The guide block 84 has a long and slender rectangular parallelepiped shape, and extends substantially parallel to the bottom wall 12*a*. The ten guide blocks 84 are arranged along the axial direction of the magnetic disk 18 at predetermined intervals therebetween. As shown in FIGS. 10 and 11, a rectangular recess (notch) 86 is formed in one end of each guide block 84, which is on a side of the magnetic disk 18. In the state where the ramp 80 is provided on the base 12, the outer circumferential portions of the ten magnetic disks 18 are located respectively in the recesses 86 of the corresponding guide block 84 with a gap B.

Each guide block 84 comprises an upper guide surface (first guide surface) Ga which guides and supports the tab 46 of the head-down suspension assembly 30, and a lower guide surface (second guide surface) Gb which guides and supports the tab 46 of the head-up suspension assembly 30. The upper guide surface Ga and the lower guide surface Gb are located to oppose each other and provided substantially perpendicular to the whole surface of the ramp body 82.

The upper guide surfaces Ga and the lower guide surfaces Gb of the ten guide blocks 84 are arranged in the axial direction of the magnetic disk 18 at predetermined intervals therebetween, and are disposed according to the heights of the corresponding suspension assemblies 30, respectively. The guide surfaces Ga and Gb are expanded substantially in the radial direction of the respective magnetic disk 18, to near the outer circumferential edge of the magnetic disk 18, and are located on the movement paths of the tab 54.

The upper guide surface Ga includes a first slope 87*a* which inclines and extends from near the surface (near the recess 86) of the respective magnetic disk 18 towards a direction away from the magnetic disk 18, which is, here, upwards, so as to load and unload the respective magnetic head 17 on the magnetic disk 18, a support surface 87*b* which extends continuously from the first slope 87*a* to be substantially parallel to the surface of the magnetic disk 18, and a second slope 87*c* which inclines and extends from the other end of the support surface 87*b* to the terminal end of the guide surface Ga.

Similarly, the lower guide surface Gb includes a first slope 88*a* which inclines and extends from near the surface (near the recess 86) of the respective magnetic disk 18 towards a direction away from the magnetic disk 18, which is, here, downwards, so as to load and unload the respective magnetic head 17 on the magnetic disk, a support surface 88*b* which extends continuously from the first slope 88*a* to be substantially parallel to the surface of the magnetic disk 18, and a second slope 88*c* which inclines and extends from the other end of the support surface 88*b* to the terminal end of the guide surface Gb.

As shown in FIG. 11, as the inclination degree of the first slope 87*a*, a height (thickness of the beak shaped portion) A taken along the direction perpendicular to the surface of the magnetic disk 18, which is between the tip of the first slope 87*a* (which is the end closest to the surface of the magnetic disk 18) and the rear end of the first slope 87*a*, is set to 0.3 mm or more but 0.35 mm or less, here, for example, 0.342 mm (0.381 mm in the comparative example). Similarly, a height (thickness of the beak shaped portion) A of the first slope 88*a* is set to, for example, 0.342 mm.

The lower guide surface Gb of one guide block 84 opposes the upper guide surface Ga of the next guide block 84 at a predetermined gap therebetween. A minimum gap C between the lower guide surface Gb and the upper guide surface Ga (the gap between the support surfaces 87*b* and 88*b*) set to 0.2 mm or more but 0.25 mm or less, here, for example, 0.25 mm, (0.268 mm in the conparative example).

Furthermore, a gap B between the ramp and the surface of a magnetic disk 18, which is one of the parameters which determine the shock proof to the operation of the magnetic disk device, is set to 0.275 mm, which is the same value employed when nine magnetic disks 18 are loaded.

FIG. 9 shows the state where the tab 46 of the head-up suspension assembly 30 and the tab 46 of the head-down suspension assembly 30 are engaged respectively with the lower guide surface Gb and the upper guide surface Ga. In the tabs 46, the position where it is engaged with the guide surface Ga or Gb is set as a loading point P.

In the HDD, the actuator assembly 22 is pivoted around the support shaft 31 by the VCM 24, and thus a plurality of magnetic heads 17 are each moved to a respective desired seeking position while they are facing the surfaces of the respective magnetic disks 18. When the HDD is not in operation, if the magnetic heads 17 are each moved off from the outer circumferences of the respective magnetic disk 18 to a predetermined stop position, the tabs 46 of the suspension assemblies 30 climb up the upper guide surface Ga and the lower guide surface Gb of the corresponding guide blocks of the ramp 80, respectively. Thus, the magnetic heads 17 can be held in the unloading positions off the magnetic disks 18.

Next, the spoiler 70 of the HDD will be described.

FIG. 12 is a perspective view showing the spoiler, and FIG. 13 is a cross sectional view showing some parts of the spoiler and magnetic disks.

As shown in FIG. 12, the spoiler 70 comprises a main body 72, a support sleeve 73 provided on the main body 72, and a plurality of fins 74 extending substantially perpendicular from the main body 72, which are formed of a synthetic resin or metal such as to be integrated as one body. As shown in FIG. 1 and FIG. 2, as the support sleeve 73 is mounted on the axis formed to stand from the bottom wall 12*a* of the base 12, the spoiler 70 is set substantially perpendicular on the bottom wall 12*a*. The spoiler 70 is disposed near the outer circumference edges of the magnetic disks 18 on an upstream side of the actuator assembly 22 with regard to the rotation direction B of the magnetic disks 18.

As shown in FIGS. 12 and 13, a plurality of, for example, eleven fins 74 are arranged substantially parallel to each other at predetermined intervals therebetween. Except for the uppermost fin 74*a* and the lowermost fin 74*b*, the other nine fins 74 each expand out between each respective adjacent pair of two magnetic disks 18 which are buried, such as to oppose the outer circumferential portions of the respective magnetic disks 18 with respective gaps therebetween.

The uppermost fin 74*a* opposes the upper surface of the uppermost magnetic disk 18 with a gap therebetween. The lowermost fin 74*b* opposes the lower surface of the lowermost magnetic disk 18 with a gap therebetween.

The fins 74 are each formed to have a thickness t1 in a proximal end portion thereof on a side of the main body 72, of 0.45 mm or more but 0.8 mm or less, for example, 0.794 mm, and a thickness t2 in an extending end (tip), of, for example, 0.5 mm. That is, the fins 74 are each formed such that the thickness gradually decreases towards the distal end portion from the proximal end portion. The fins 74 of the spoiler 70 rectify the wind generated above the surfaces of the magnetic disks 18, to reduce the disturbance caused by the wind against the actuator assembly 22. Thus, the vibration of the actuator assembly 22 can be suppressed, thereby making it possible to improve the accuracy in the head positioning.

With the HDD according to this embodiment, configured as above, the distance La from the tip of the base plate 38 of the suspension assembly to the dimple 48 is increased, whereas the distance Lb from the dimple 48 to the tip the tab 46 is decreased, and thus the height variation Hv at the tip of the tab 46, which is caused by the height variation Hh of the base plate 38, can be suppressed to a smaller degree. With achievement of such a small degree of the height variation Hv of the tab 46, the thickness A of the beak-shaped portion of the ramp 80, required to stably load and unload the magnetic heads 17, and also the gap (the distance between beak-shaped portions) C, required to avoid tabs 46 from contacting each other when they are situated back to back on the ramp 80 (FIG. 9), can be reduced. Therefore, the gap d between each adjacent pair of magnetic disks 18 can be reduced as well without causing an increase in the height of the ramp 80. As a result, if magnetic disks 18 having a thickness of 0.5 mm or less are used, ten or more magnetic disks 18 can be installed in a 3.5-inch standard HDD with the housing 10 whose maximum thickness (height) H is 26.1 mm. In this manner, a mass magnetic disk device can be realized.

Furthermore, even in the case where ten magnetic disks are installed, the gap B between the ramp 80 and the surface of the respective magnetic disk can be maintained to 0.275 mm, which is the same value as the case where nine magnetic disks are installed, making it possible to maintain the shock proof of the magnetic disk device.

Moreover, with the thinned fins of the spoiler, it is possible, even when ten magnetic disks 18 are installed, to install the spoiler 70. With the spoiler 70, the disturbance by wind which acts on the actuator assembly 22 by can be suppressed, thereby making it possible to improve the accuracy in positioning of the magnetic heads.

As described above, according to this embodiment, a disk device which can increase the number of recording media to be installed, can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the embodiment mentioned above, a 1.235 mm-long Pemto-slider is used for the slider of the magnetic head 17, but the type of the slider is not limited to this. For example, a 0.85 mm-long phemto-slider may be used. In this case, the ratio (La/Lb) of the distance La from the tip of the base plate to the center of the dimple, to the distance Lb from the center of the dimple to the tip of the tab is 3.65, and the height variation at the tip of the tab, with respect to 100 μm of the height variation at the tip of the base plate is 27.4 μm.

Moreover, the number of magnetic disks to be installed is not limited to ten, but may be increased to eleven or twelve.

What is claimed is:

1. A disk device comprising:
a housing;
ten or more but twelve or less magnetic disks disposed in the housing and opposing each other at intervals;
suspension assemblies each supporting a magnetic head, and being movable with respect to the magnetic disks; and
a ramp comprising a plurality of guide surfaces, on which tabs of the suspension assemblies are climbable, respectively,
wherein the ramp comprises the guide surfaces opposed to each other with a gap therebetween,
each of the guide surfaces of the ramp includes a first slope that inclines and extends from near a surface of the respective magnetic disk in a direction away from the magnetic disk, and a support surface that continuously extends from the first slope in a direction away from the magnetic disk, and
a minimum gap between the support surfaces of the opposing guide surfaces is 0.2 mm or more but 0.25 mm or less.

2. The disk device of claim 1, wherein
a distance between one end and other end of the first slope in a direction perpendicular to the surface of the magnetic disk is 0.3 mm or more but 0.35 mm or less.

3. The disk device of claim 1, wherein
a thickness of the magnetic disks is 0.35 mm or more but 0.635 mm or less.

4. The disk device of claim 1, wherein
the housing has a maximum height of 26.1 mm, defined by 3.5-inch disk device standards.

5. The disk device of claim 1, wherein
each of the suspension assemblies comprises an expandable/contractable piezoelectric element.

6. The disk device of claim 1, wherein
a gap between two adjacent magnetic disks opposing each other is 1.2 mm or more but 1.5 mm or less.

7. The disk device of claim 2, further comprising a spoiler provided in the housing and comprising a plurality of fins each inserted in a gap between two adjacent magnetic disks, wherein a thickness of a proximal end portion of each of the plurality of fins is 0.45 mm or more but 0.8 mm or less.

* * * * *